Aug. 26, 1958 W. M. SPRENG 2,849,174
FAN SUPPORT FOR BLOWER
Filed Aug. 8, 1956 2 Sheets-Sheet 1

INVENTOR.
WARREN M. SPRENG
BY
ATTORNEYS

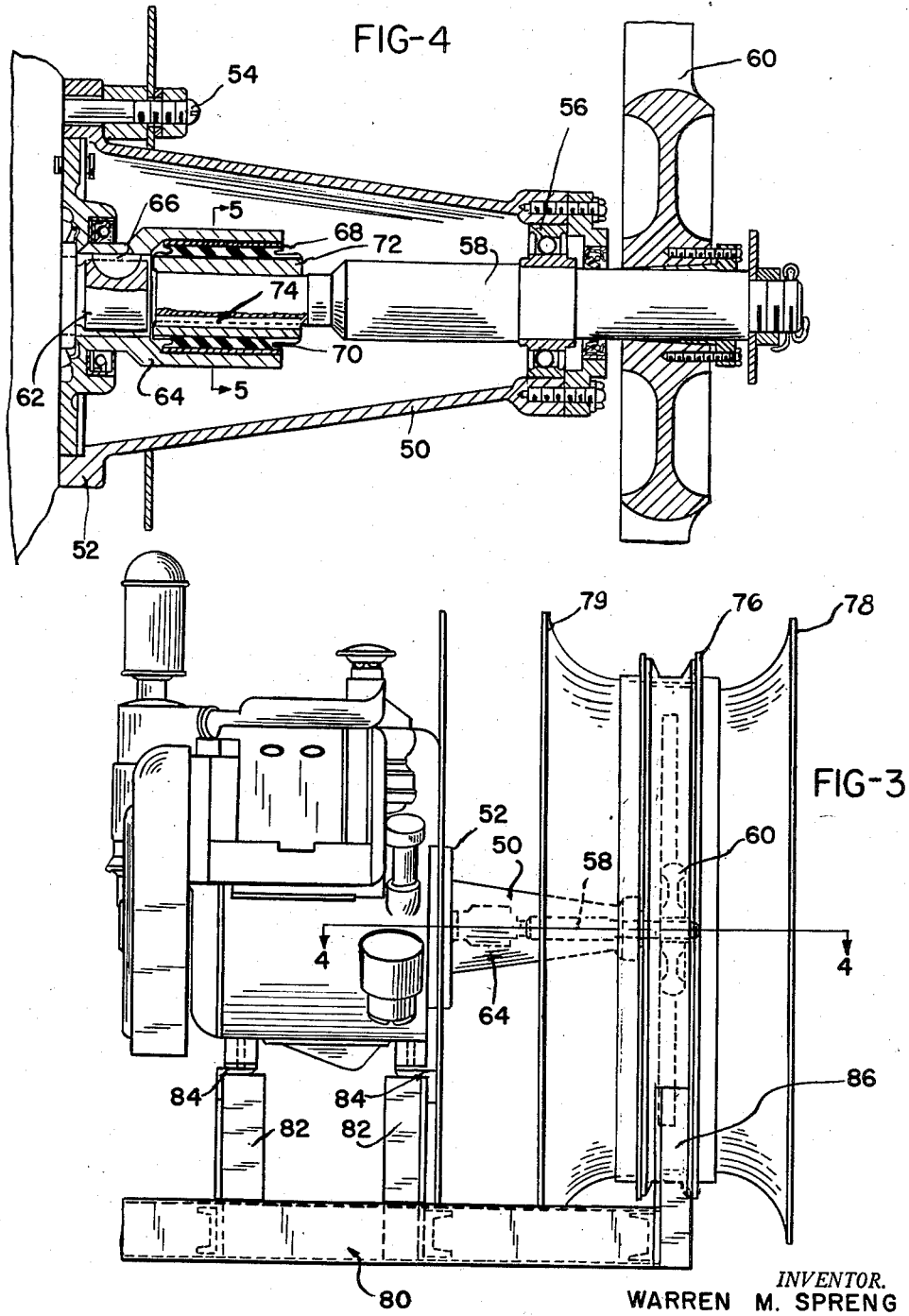

United States Patent Office 2,849,174
Patented Aug. 26, 1958

2,849,174

FAN SUPPORT FOR BLOWER

Warren M. Spreng, Ashland, Ohio, assignor to The F. E. Myers & Bro. Co., Ashland, Ohio, a corporation of Ohio Application August 8, 1956, Serial No. 602,692

5 Claims. (Cl. 230—116)

This invention relates to spraying machines, and in particular to the blower section of a spraying machine.

In the usual type of commercial spraying machines for spraying insecticides and fungicides and the like on vegetation an air blast is employed for carrying the material to the vegetation that is being sprayed. This not only provides for a large area of coverage, but also promotes a high degree of efficiency of coverage since the air blast agitates the vegetation to a degree sufficient that the spraying material will completely cover the surface thereof and thus be most efficiently applied.

An important portion of any such spraying machine resides in the blower and the drive motor or drive engine therefor.

A particular object of the present invention is the provision of an improved blower and engine arrangement of the nature referred to especially adapted for use in connection with spraying machines of the nature described.

Another particular object of the present invention is the provision of a blower having a rotary element adapted for being directly connected with the drive engine in which the usual problems of extreme vibration are eliminated.

A further object of the present invention is the provision of a coupling arrangement for connecting a rotary impeller with an engine drive shaft in such a manner as to vibratorily isolate the engine and the impeller.

A further object of the present invention is the provision of a drive and supporting arrangement for a blower impeller which greatly enhances the life of the supporting bearings for the impeller by eliminating vibration.

A still further particular object of the present invention is the provision of an engine and blower fan combination which consists of a unitary structure, thereby eliminating alignment problems in connection with installing the unit.

Another object of the present invention is the provision of a unit of the nature referred to which is relatively inexpensive and which thus provides the advantage of air blast spraying for users who cannot afford the cost of a larger machine.

These and other objects and advantages of this invention will become more apparent upon reference to the following specification taken in connection with the accompanying drawings, in which:

Figure 3 is a side elevational view of the blower and engine and the supporting frame therefor of the arrangements of either Figures 1 or 2 showing somewhat more in detail the relationship of the several elements of the structure;

Figure 4 is a sectional view indicated by line 4—4 on Figure 3; and

Figure 1:
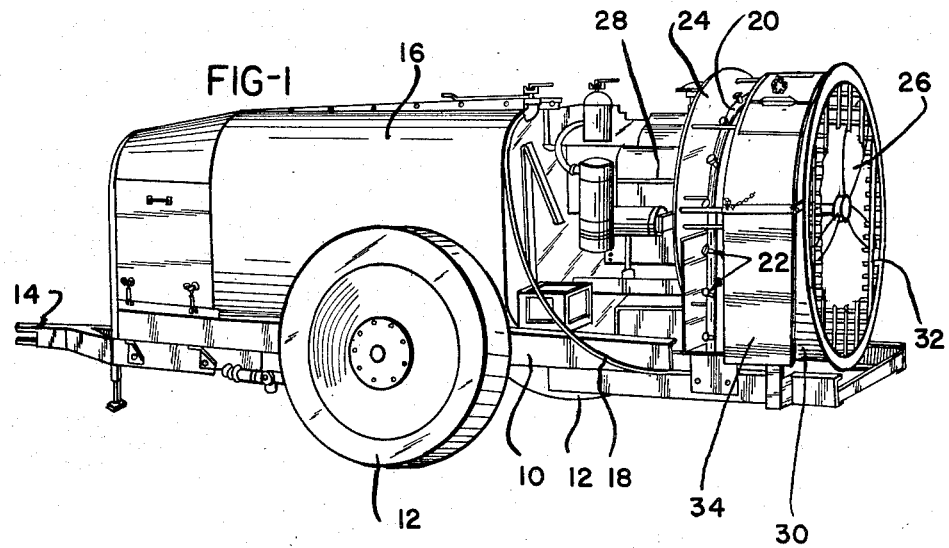
Figure 1 is a perspective view showing a complete spraying machine embodying the present invention.

Referring to the drawings somewhat more in detail, the arrangement of Figure 1 shows a complete air blast spraying machine which consists of a frame or chassis 10 having supporting wheels 12 and being provided with a hitch element at 14 so that the spraying machine can be connected with a tractor or the like to be drawn thereby.

Mounted on frame or chassis 10 is a tank 16 adapted for containing the material to be dispensed by the spraying machine, usually insecticide or fungicide. This material is maintained admixed in tank 16 by any suitable agitator arrangement and is delivered via a hose 18 to an arcuate conduit 20 containing spaced spray nozzles 22. This material is under substantial pressure so that it sprays from the nozzles 22 in the form of fine droplets or as a fine spray.

Conduit 20 extends arcuately about the annular exit opening formed between a pair of spaced baffle walls, the rear one of which is indicated at 24. A powerful airstream is driven radially outwardly between the said walls by a fan 26 adapted for being driven in rotation by an engine 28. Fan 26 is located within a housing 30 and draws air inwardly through a screened opening 32.

The annular opening in which the conduit 20 is disposed is arranged for being variably opened by means of sliding cover members 34. These cover members are adjustable to permit the spray to issue from either one side or the other side of the machine at one time, or from both sides at one time, or from either or both sides and the top of the machine so that foliage of any type can be sprayed.

Figure 2:
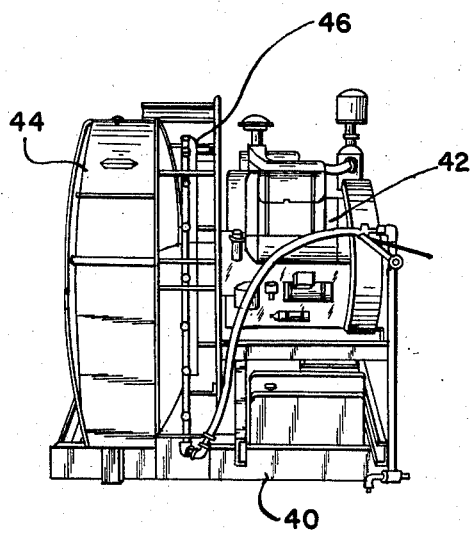
Figure 2 is a perspective view showing a blower attachment adapted for use in connection with spraying machines or for converting a high pressure sprayer into a one-man operated air blast sprayer.
Figure 5:
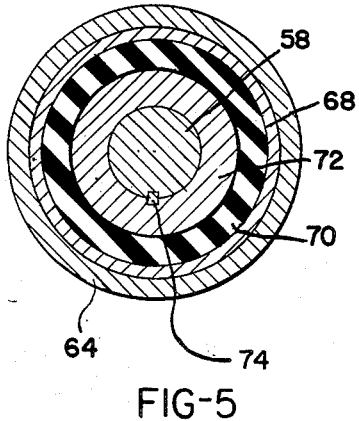
Figure 5 is a sectional view indicated by line 5—5 on Figure 4.

The arrangement of Figure 2 is similar to that of Figure 1 except that there is shown therein a unit adapted for being assembled with a high pressure sprayer to convert the sprayer into an air blast sprayer adapted for operation by one man.

In the arrangement of Figure 2 there is a frame 40 that carries a drive engine 42 which drives a fan within housing section 44 that discharges air through the annular opening 46 which, similarly to the opening referred to in the Figure 1 modification, is adapted for being selectively closed and opened on the two sides or across the top thereof to provide for a variable spray pattern.

According to the present invention there is provided a novel mounting for the propeller type fan which forms an integral part of the blower section of the assembly. As will be seen in Figures 3 and 4 the engine has fixed to the crankcase thereof a housing 50 having at its one end a flange 52 that is secured by means of bolts or studs 54 to the crankcase. These bolts or studs are also availed of for supporting the back plate forming the one side of the annular opening through which the blower discharges its air.

At its opposite end elongated housing 50 supports an antifriction bearing 56, and this bearing provides support for a shaft 58 that carries at its outer end the fan 60.

A particular feature of the present invention resides in the connection between propeller shaft 58 and output shaft 62 of the engine. This is accomplished by means of a drive sleeve 64 fixed to the output shaft 62 of the engine by a key 66, and which drive sleeve receives therein, with a light press fit, a resilient coupling which consists of an outer metallic sleeve 68 that fits directly within drive sleeve 64, a rubberlike intermediate section 70 bonded inside sleeve 68, and an inner sleeve portion 72 that is connected with the end of propeller shaft 58 by key 74.

The arrangement described above provides for effective isolation of the blower from the engine so far as the individual vibrations thereof are concerned. Substantially no vibrations are transmitted between the output shaft of the engine and the propeller shaft.

It will be evident, of course, that the degree of resiliency of the coupling could be varied to meet variable conditions. This would have little effect upon the operation of the unit since the propeller always rotates in one direction and is continuously under load when the machine is operated. Thus, the resiliency of the coupling can be selected to provide for the maximum absorption of vibration while still maintaining firm and stable the driving connections between the engine output shaft and the propeller shaft.

As will best be seen in Figure 3 it is preferred to arrange the propeller in the central section of the blower section, which consists of a cylindrical central portion 76 immediately surrounding the propeller fan. This central portion 76 preferably communicates with an inwardly tapering inlet member 78 and an outwardly tapering discharge member 79.

The particular type fan illustrated is of particular benefit in connection with the arrangement shown, but it will be understood that other types of impellers are adapted for being directly connected with an engine drive shaft according to the principles of this invention. For example, instead of an axial flow type fan, a volute type fan could be used equally well and the same advantages would obtain.

It will also be seen in Figure 3 that the assembly according to the present invention is relatively simply arrived at, and that the base or frame may consist of the interconnected channels generally indicated at 80 and having attached thereto, and upstanding therefrom, angles 82 which support the horizontally extending angles 84 which form the platform on which the engine is supported and rigidly connected with the said frame.

In spaced relation with the engine support the frame also comprises the upstanding angles 86 that are affixed as by welding to the central cylindrical portion 76 of the blower section. The inlet and outlet portions 78 and 79 are bolted to opposite sides of the central portion 76, and the propeller and the support therefor are connected with the engine as previously described to complete the basic assembly.

It will be understood that this invention is susceptible to modification in order to adapt it to different usages and conditions, and accordingly it is desired to comprehend such modifications within this invention as may fall within the scope of the appended claims.

I claim:

1. In combination in an engine powered blower arrangement; an engine having a crankcase and an output shaft extending outwardly thereof, a housing support element fixed to the engine crankcase, a second shaft journalled in the outer end of said support element co-axially with said output shaft, said second shaft being adapted for supporting a blower impeller on its outer end, resilient coupling means drivingly connecting the shafts together, said coupling means comprising an inner sleeve keyed to said second shaft, an outer sleeve concentric with the inner sleeve, rubberlike material between said sleeves and bonded to one thereof, and a rigid connector keyed at one end to said output shaft and having a cylindrical projection lightly press fitted over said outer sleeve whereby the shafts are drivingly interconnected while the inner end of the said second shaft receives radial support from the output shaft.

2. In an air blast sprayer; a frame portion, an engine having a crankcase and an output shaft extending outwardly therefrom mounted on the frame portion, a support element fixed to the engine crankcase and extending out therefrom about the projected axis of the output shaft, a fan shaft journalled in the outer end of the support element coaxial with said output shaft, a resilient coupling drivingly interconnecting said shafts and providing radial support for the inner end of the fan shaft, a fan on the outer end of the fan shaft, and a fan housing fixed to the said frame portion and surrounding said fan.

3. In a unit adapted for being assembled with a high pressure sprayer to convert the sprayer to an air blast spray unit; a frame portion, an engine mounted on the frame portion having an output shaft, a support element fixed to the engine and extending out therefrom about the projected axis of the output shaft, a baffle plate attached to the engine end of said support element and being substantially perpendicular to the axis of the output shaft to direct the air blast radially of the axis of said output shaft, a fan shaft journalled in the outer end of the support element coaxial with said output shaft, a resilient coupling drivingly interconnecting said shafts and providing radial support for the inner end of the fan shaft, a fan on the outer end of the fan shaft, and a fan housing fixed to the said frame portion and surrounding said fan but stopping short of said baffle plate.

4. In combination in an engine powered blower arrangement; an engine having an output shaft, a fan shaft aligned with the output shaft, a resilient coupling drivingly interconnecting said shafts, a fan on the outer end of the fan shaft arranged to blow air toward the engine, a bearing for the fan shaft adjacent the fan on the engine side thereof, and a support element supporting said bearing at its outer end and being rigidly fixed to the engine at its other end, said support element tapering toward said outer end thereof, and means forming a radial discharge opening for the blown air between the fan and the engine and including a radially extending plate in the region of the said other end of the support element.

5. In combination; an engine and a blower fan and means mounting the fan directly on the engine and drivingly connecting the fan with the engine comprising, a fan shaft, a bearing rotatably supporting the shaft adjacent the fan, a rigid support element fixed to the engine and supporting said bearing, and a resilient coupling drivingly connecting the end of the fan shaft with the engine output shaft and radially supporting the end of the fan shaft whereby the engine and fan form an integral unit but are isolated with respect to torsional vibrations.

References Cited in the file of this patent

UNITED STATES PATENTS

| 1,407,889 | Schmidt | Feb. 28, 1922 |
| 2,030,474 | Schmidt | Feb. 11, 1936 |
| 2,032,900 | Alger | Mar. 3, 1936 |
| 2,256,345 | Mart | Sept. 16, 1941 |